(12) United States Patent  
Wang et al.

(10) Patent No.: US 8,403,375 B2  
(45) Date of Patent: Mar. 26, 2013

(54) FACE PANEL FOR A COMPUTER HOUSING

(75) Inventors: Jo-Chiao Wang, Taipei Hsien (TW); Hsuan-Ying Wen, Taipei Hsien (TW)

(73) Assignee: AOPEN Inc. (TW)

( * ) Notice: Subject to any disclaimer, the term of this patent is extended or adjusted under 35 U.S.C. 154(b) by 733 days.

(21) Appl. No.: 12/546,626

(22) Filed: Aug. 24, 2009

(65) Prior Publication Data

US 2010/0052484 A1    Mar. 4, 2010

(30) Foreign Application Priority Data

Aug. 26, 2008    (TW) ................................ 97215318 U (51) Int. Cl.  
*E05C 19/06*    (2006.01)

(52) U.S. Cl. ............. 292/83; 292/82; 292/137; 292/146

(58) Field of Classification Search ............. 292/82, 292/83, 137, 159, 170, 140, 146; 312/223.2; 361/679.58, 679.57  
See application file for complete search history.

(56) References Cited

U.S. PATENT DOCUMENTS

| | | | | | |
|---|---|---|---|---|---|
| 1,836,970 | A | * | 12/1931 | Hiering | 292/83 |
| 3,039,802 | A | * | 6/1962 | Barry | 292/19 |
| 3,261,629 | A | * | 7/1966 | Campbell | 292/169.21 |
| 4,249,760 | A | * | 2/1981 | Conley | 292/197 |
| 6,373,690 | B1 | * | 4/2002 | Buican et al. | 361/679.59 |
| 6,637,847 | B2 | * | 10/2003 | Crisp et al. | 312/223.2 |
| 7,665,813 | B2 | * | 2/2010 | Wang | 312/220 |
| 7,758,133 | B2 | * | 7/2010 | Chen et al. | 312/223.2 |
| 8,047,620 | B2 | * | 11/2011 | Yu et al. | 312/333 |
| 8,147,011 | B2 | * | 4/2012 | Chen et al. | 312/333 |
| 8,186,779 | B2 | * | 5/2012 | Chen et al. | 312/334.47 |
| 2002/0074911 | A1 | * | 6/2002 | Chen et al. | 312/265.5 |
| 2003/0160460 | A1 | * | 8/2003 | Crisp et al. | 292/83 |
| 2004/0164656 | A1 | * | 8/2004 | Roesner et al. | 312/223.2 |
| 2007/0001559 | A1 | * | 1/2007 | Chen et al. | 312/223.2 |
| 2007/0222347 | A1 | * | 9/2007 | Chen et al. | 312/223.2 |
| 2008/0158807 | A1 | * | 7/2008 | Lu et al. | 361/683 |
| 2008/0309097 | A1 | * | 12/2008 | Lin et al. | 292/83 |
| 2009/0154080 | A1 | * | 6/2009 | Lee et al. | 361/679.02 |
| 2009/0322193 | A1 | * | 12/2009 | Yamaguchi | 312/223.2 |
| 2009/0323269 | A1 | * | 12/2009 | Iwata | 361/679.09 |
| 2010/0052484 | A1 | * | 3/2010 | Wang et al. | 312/223.2 |
| 2010/0117497 | A1 | * | 5/2010 | Wu et al. | 312/223.2 |
| 2010/0156255 | A1 | * | 6/2010 | Cheng et al. | 312/223.2 |
| 2010/0187957 | A1 | * | 7/2010 | Liang | 312/223.2 |
| 2010/0264792 | A1 | * | 10/2010 | Chang | 312/294 |
| 2011/0074259 | A1 | * | 3/2011 | Chen | 312/223.2 |
| 2011/0141683 | A1 | * | 6/2011 | Zhang et al. | 361/679.33 |
| 2011/0156553 | A1 | * | 6/2011 | Tang | 312/223.2 |
| 2011/0298342 | A1 | * | 12/2011 | Li | 312/223.2 |
| 2011/0304247 | A1 | * | 12/2011 | Yan et al. | 312/223.2 |
| 2011/0317342 | A1 | * | 12/2011 | Li | 361/679.01 |
| 2012/0007480 | A1 | * | 1/2012 | Chen et al. | 312/223.2 |
| 2012/0018214 | A1 | * | 1/2012 | Tsai et al. | 174/535 |
| 2012/0056515 | A1 | * | 3/2012 | Chen et al. | 312/223.2 |

\* cited by examiner

*Primary Examiner* — Kristina Fulton  
(74) *Attorney, Agent, or Firm* — The Mueller Law Office, P.C.

(57) ABSTRACT

A face panel for a computer housing includes a face panel body and a cover plate assembly. The face panel body includes a surrounding wall and a mounting hole. The surrounding wall has first and second engaging grooves. The cover plate assembly includes a cover plate, a locking member, and an unlocking member. The cover plate has a first engaging hook for engaging the first engaging groove, and a guide groove. The locking member is assembled to the guide groove, and has a second engaging hook, a post, and a restoring resilient plate to apply a pressure to the cover plate so as to enable the second engaging hook to engage the second engaging groove. The unlocking member has an operating portion, and a contact portion movable with the operating portion so as to push the post for disengaging the second engaging hook from the second engaging groove.

18 Claims, 11 Drawing Sheets

FACE PANEL FOR A COMPUTER HOUSING

CROSS-REFERENCE TO RELATED APPLICATION

This application claims priority of Taiwanese Application No. 09721531, filed on Aug. 26, 2008.

BACKGROUND OF THE INVENTION

1. Field of the Invention

The invention relates to a face panel for a computer housing, more particularly to a face panel for a computer housing which has a mounting hole for insertion of a data access device and which permits a cover plate assembly to be mounted in the mounting hole.

2. Description of the Related Art

Figure 1:
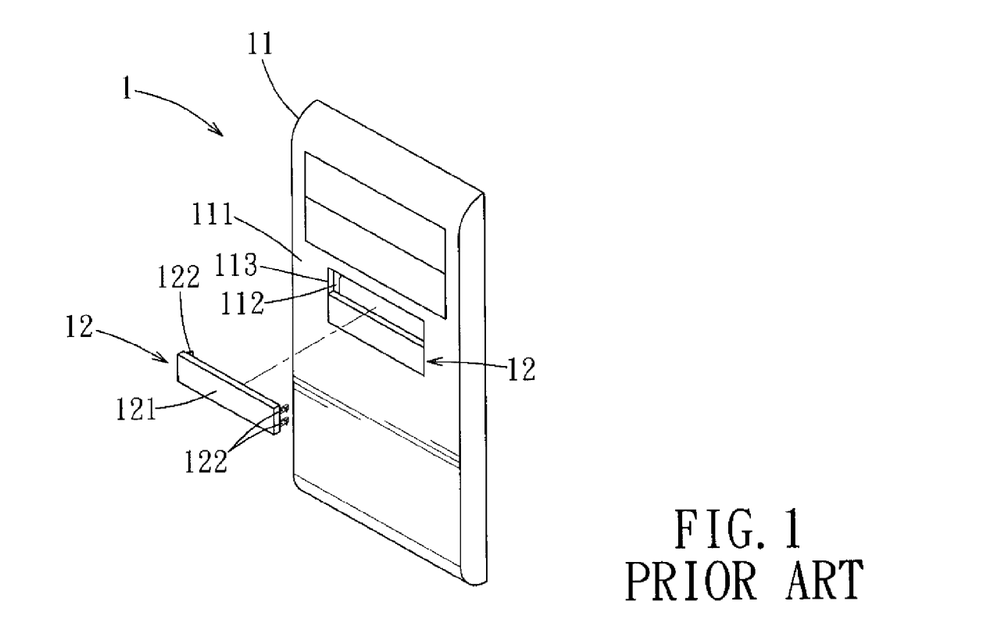
FIG. 1 is a partly exploded perspective view of a conventional face panel for a computer housing.
Figure 2:
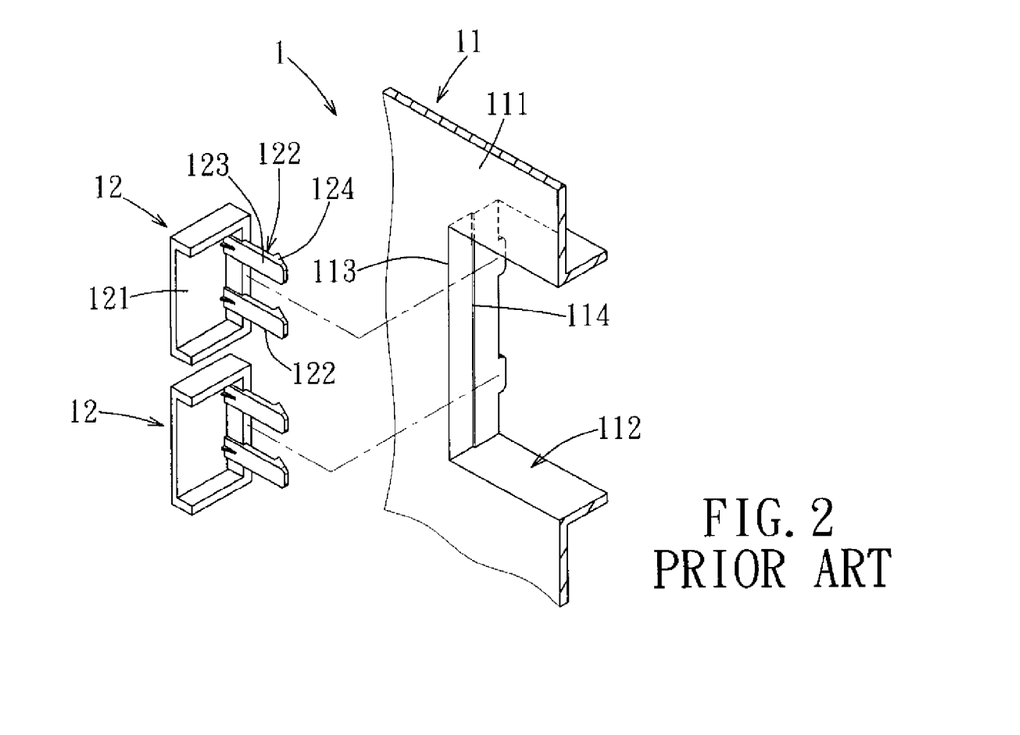
FIG. 2 is a fragmentary enlarged exploded perspective view of FIG. 1.
Figure 3:
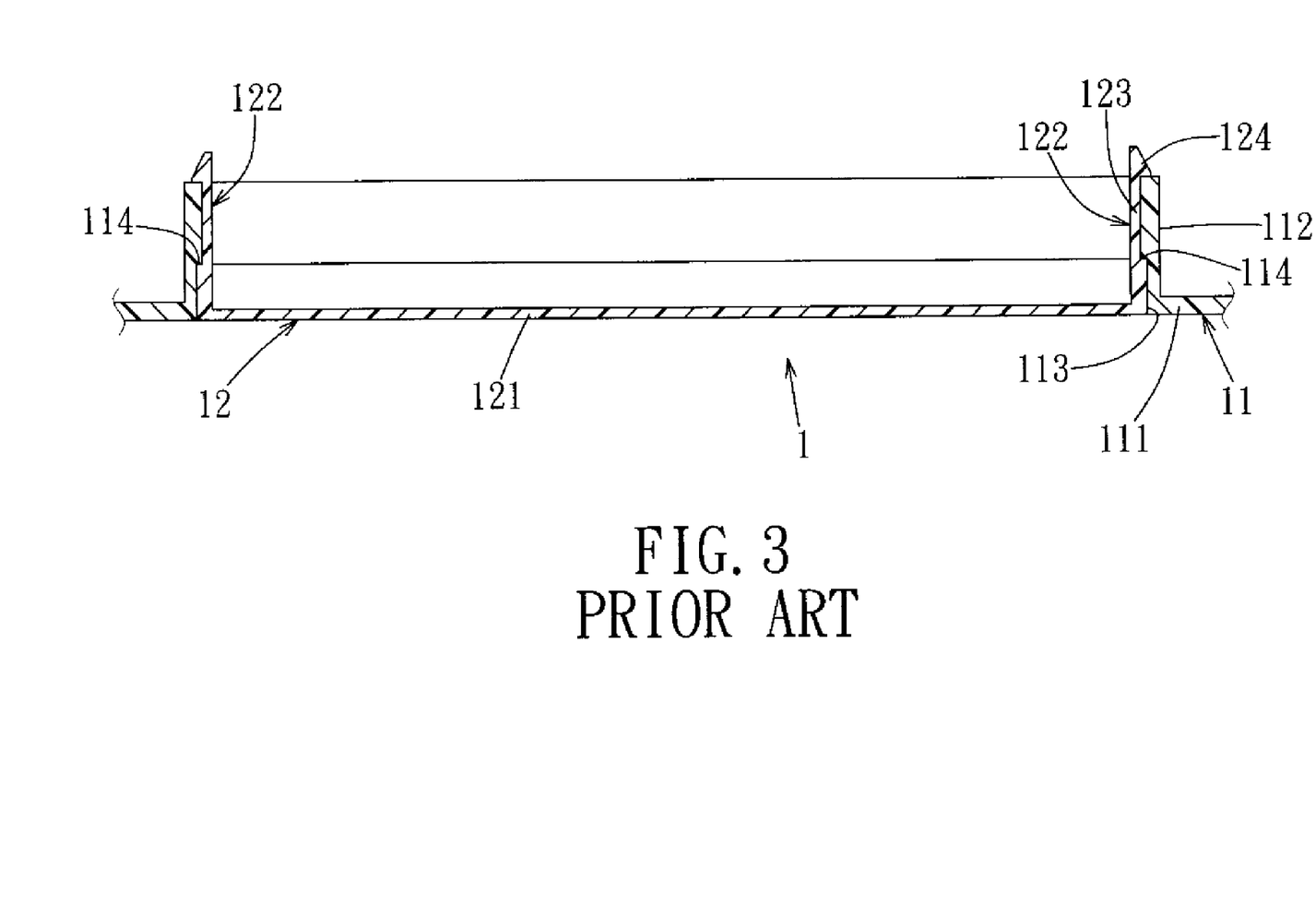
FIG. 3 is a schematic sectional view of FIG. 1, illustrating how a cover is assembled to a face panel body.

Referring to FIGS. 1, 2, and 3, a face panel 1 of a conventional computer housing includes a face panel body 11, and a plurality of covers 12 removably assembled to the face panel body 11. The face panel body 11 includes an upright wall 111, a mounting hole 113 formed in the upright wall 111, and a surrounding wall 112 projecting rearwardly from the upright wall 111 and defining the mounting hole 113. The surrounding wall 112 is for mounting of data access devices, such as an optical disk drive, therein. The surrounding wall 112 has two shoulder portions 114 located respectively at left and right sides thereof and at an intermediate part. Each of the covers 12 includes a cover plate 121 mounted in the mounting hole 113, and two pairs of engaging hooks 122 projecting from a rear side of the respective cover plate 121 for engaging a rear end of the surrounding wall 112. Each of the engaging hooks 122 has a resilient arm 123 projecting rearwardly from the respective cover plate 121, and an engaging portion 124 projecting from a distal end of the resilient arm 123.

Each of the covers 12 is retained and secured on the face panel body 11 when a rear end of the cover plate 121 thereof abuts against the shoulder portions 114 of the surrounding wall 112 and when the engaging portions 124 of the engaging hooks 122 thereof engage the rear end of the surrounding wall 112. When it is desired to remove the cover 12, a user needs to force the engaging portions 124 of each of the pairs of engaging hooks 122 inwardly at the same time from a rear side of the face panel body 11 to disengage the engaging portions 124 of the engaging hooks 122 from the rear end of the surrounding wall 112 in order to detach the cover 12 from the face panel body 11.

However, the configuration of the engaging hooks 122 of the covers 12 requires that the removal operation of the covers 12 be conducted from the rear side of the face panel body 11. The removal operation cannot be conducted from a front side of the face panel body 11, which is inconvenient for the user during removal. Furthermore, if a force is improperly applied by the user during removal of the covers 12, breaking of the engaging hooks 122 may occur, thereby rendering it impossible to re-assemble the covers 12 to the face panel body 11.

SUMMARY OF THE INVENTION

Therefore, the main object of the present invention is to provide a face panel for a computer housing, which has a cover plate assembly that can be assembled to or disassembled from a face panel body in a quick and convenient manner.

The aforesaid object of the present invention and solutions to technical problems associated therewith are realized using the technical means described hereinbelow. The face panel for a computer housing as disclosed in this invention includes a face panel body and a cover plate assembly.

The face panel body includes a surrounding wall, and a mounting hole defined by the surrounding wall and having a forward opening. The surrounding wall has a first engaging groove and a second engaging groove located respectively at left and right sides thereof. The cover plate assembly is provided in the mounting hole and is assembled to the surrounding wall. The cover plate assembly includes a cover plate, a locking member, and an unlocking member. The cover plate has a through plate hole extending in a front-rear direction, a first engaging hook for engaging the first engaging groove, and a guide groove provided in a rear face thereof and extending along a left-right direction. The locking member is connected slidably to the guide groove and has a second engaging hook for engaging the second engaging groove, a through hole corresponding in position to the through plate hole, a post projecting from a rear face thereof, and a restoring resilient plate for applying a pressure to the cover plate so as to enable the second engaging hook to engage the second engaging groove. The unlocking member extends through the through plate hole and the through hole, and has an operating portion exposed through the through plate hole, and a contact portion disposed opposite to the operating portion and movable by rotation of the operating portion so as to push the post to move, such that the second engaging hook is disengaged from the second engaging groove.

The object of the present invention and the solutions to the technical problems associated therewith may be further realized using the following technical means.

In the aforementioned face panel for a computer housing according to the present invention, the locking member may have only one post and the unlocking member may have only one contact portion, with the contact portion located between the post and the second engaging hook, and with the post located on a path of rotation of the contact portion, so as to permit operation of the unlocking member by a user in a single direction. In addition, the locking member may have two posts and the unlocking member may have two contact portions. The locking member may have the two posts projecting from the rear face thereof and spaced apart with one above the other. The unlocking member may have the two contact portions disposed opposite to the operating portion and located between the two posts and the second engaging hook. The two posts are located on the paths of rotation of the two contact portions, respectively, so as to permit rotation of the operating portion of the unlocking member by the user in clockwise and counterclockwise directions.

In the aforementioned face panel for a computer housing, the contact portion may be moved by rotation of the operating portion so as to push the post to move in a direction toward the first engaging hook.

In the aforementioned face panel for a computer housing, the cover plate has a rib provided on the rear face thereof. The restoring resilient plate includes a rearwardly extending first plate portion, and a second plate portion bending and extending forwardly from a distal end of the first plate portion and abutting against the rib. By using the restoring resilient plate to constantly apply a pressure to the cover plate, the locking member is provided with a restoring resilient force, and the second engaging hook may be engaged with the second engaging groove.

In the aforementioned face panel for a computer housing, the cover plate may be configured to have one or two guide grooves. If the cover plate is configured to have two guide grooves, the guide grooves are provided in the rear face of the cover plate, extend in the left-right direction, and are respectively proximate to upper and lower ends of the cover plate. The locking member may be connected slidably between the two guide grooves. The guide groove includes a first end, and a second end opposite to the first end. The locking member has first and second protrusions located within the guide groove for abutting against the first end and for abutting against the second end, respectively. The restoring resilient plate applies the pressure to the cover plate such that the first protrusion abuts against the first end, thereby limiting a distance of movement of the locking member.

In the aforementioned face panel for a computer housing, the locking member has an elongated guide hole extending along the left-right direction. The elongated guide hole includes a first end portion, and a second end portion opposite to the first end portion. The cover plate further has first and second studs located within the elongated guide hole. The first and second studs are disposed for abutting against the first and second end portions, respectively. The restoring resilient plate applies the pressure to the cover plate such that the first stud abuts against the first end portion, thereby limiting the distance of movement of the locking member.

In the aforementioned face panel for a computer housing, the unlocking member further has a cylindrical body extending through the through hole and the through plate hole. The cover plate further has two positioning hooks provided on the rear face thereof for engaging a rear end of the cylindrical body. In addition, the unlocking member may be alternatively configured to have a control knob defining the operating portion, and a sleeve defining the two contact portions. The control knob includes two positioning hooks extending through the sleeve and engaging a rear end of the sleeve.

In the face panel for a computer housing according to the present invention, with the arrangement of the cover plate assembly, rotation of the unlocking member by the user can drive the locking member to move so that the second engaging hook of the locking member is disengaged from the second engaging groove, thereby permitting quick and convenient removal of the cover plate assembly from a front side of the face panel body. In addition, with the use of the restoring resilient plate to restore the second engaging hook to an engaging position, the cover plate assembly and the face panel body may be switched between locked and unlocked states.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Through a detailed description of the preferred embodiments, the technical means adopted to achieve the intended object and advantageous effects of the present invention should be better understood. However, the accompanying drawings are provided for reference and illustration only and should not be based upon to limit the scope of protection sought for the present invention.

Before the present invention is described in greater detail, it should be noted that like elements are denoted by the same reference numerals throughout the disclosure.

Figure 4:
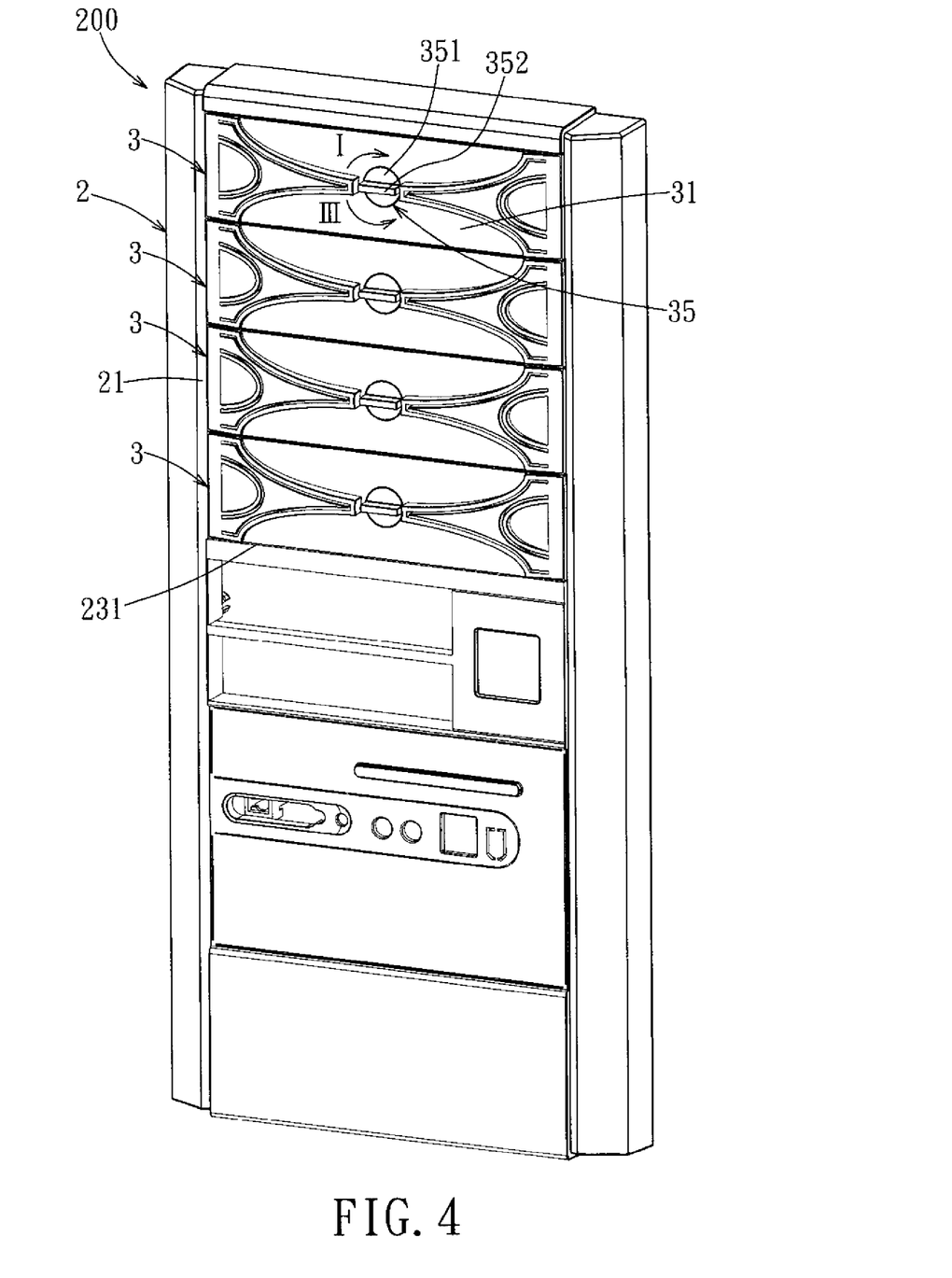
FIG. 4 is a perspective view to illustrate the first preferred embodiment of a face panel for a computer housing according to the present invention.

Referring to FIG. 4, the first preferred embodiment of a face panel 200 for a computer housing according to the present invention is shown to include a face panel body 2 and a plurality of cover plate assemblies 3 removably assembled to the face panel body 2. Since the cover plate assemblies 3 are identical in structure, to facilitate description and for the sake of clarify, the cover plate assemblies 3, and component parts thereof, are referred to in singular terms, where necessary.

Figure 5:
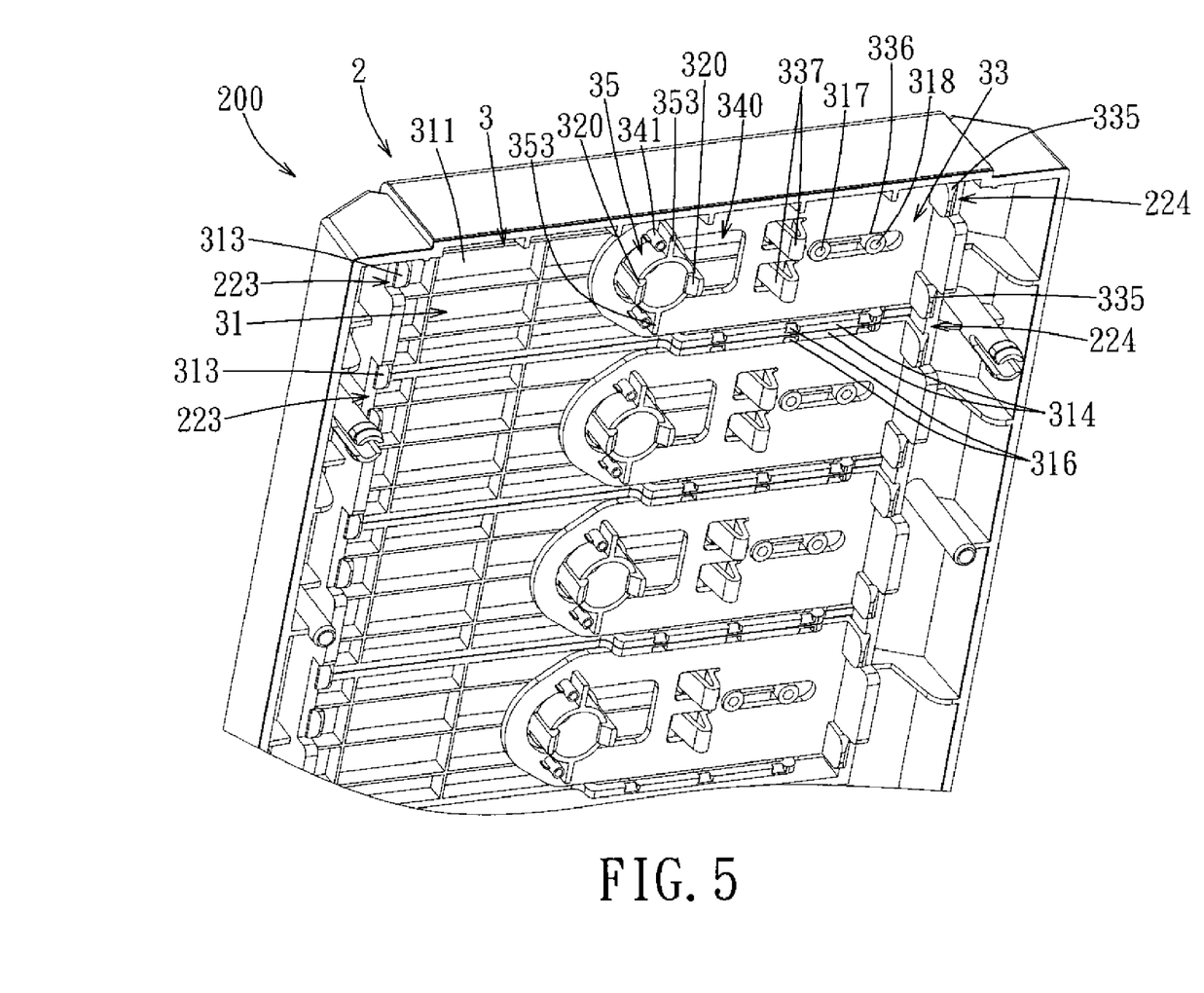
FIG. 5 is a fragmentary rear perspective view of the first preferred embodiment.

Reference is made to FIGS. 4, 5, 6 and 7. In the following description, the part of the face panel body 2 on the right side of the rear view of FIG. 5 is referred to as the right side, and the part of the face panel body 2 on the left side of the rear view of FIG. 5 is referred to as the left side. The face panel body 2 includes an upright front wall 21, a mounting hole 23 formed in the front wall 21, and a surrounding wall 22 extending rearwardly from the front wall 21 and defining the mounting hole 23. The mounting hole 23 has an opening 231 oriented forwardly, and is provided for mounting of the cover plate assemblies 3 therein. The surrounding wall 22 has a left side wall portion 221 and a right side wall portion 222 located respectively at left and right sides thereof, a plurality of first engaging grooves 223 formed in the left side wall portion 221 and spaced apart from each other, and a plurality of second engaging grooves 224 formed in the right side wall portion 222 at positions corresponding to those of the first engaging grooves 223.

The cover plate assemblies 3 are mounted in the mounting hole 23 and are assembled to the surrounding wall 22. Each of the cover plate assemblies 3 includes a cover plate 31, a locking member 33, and an unlocking member 35. The cover plate 31 has a plate body 311, a through plate hole 312 extending through the plate body 311 in a front-rear direction, and two first engaging hooks 313 that project rearwardly from a rear face of the plate body 311 proximate to a left side thereof and that are spaced apart with one above the other. Each of the first engaging hooks 313 is used to engage a respective one of the first engaging grooves 223 in the left side wall portion 221. The cover plate 31 further has two extension plates 314 projecting respectively and rearwardly from the rear face of the plate body 311 proximate to upper and lower ends of the plate body 311. Each of confronting faces of the two extension plates 314 defines a guide groove 315 that extends along a left-right direction. Each of the extension plates 314 has three guide ways 316 proximate to a rear end thereof.

Figure 6:
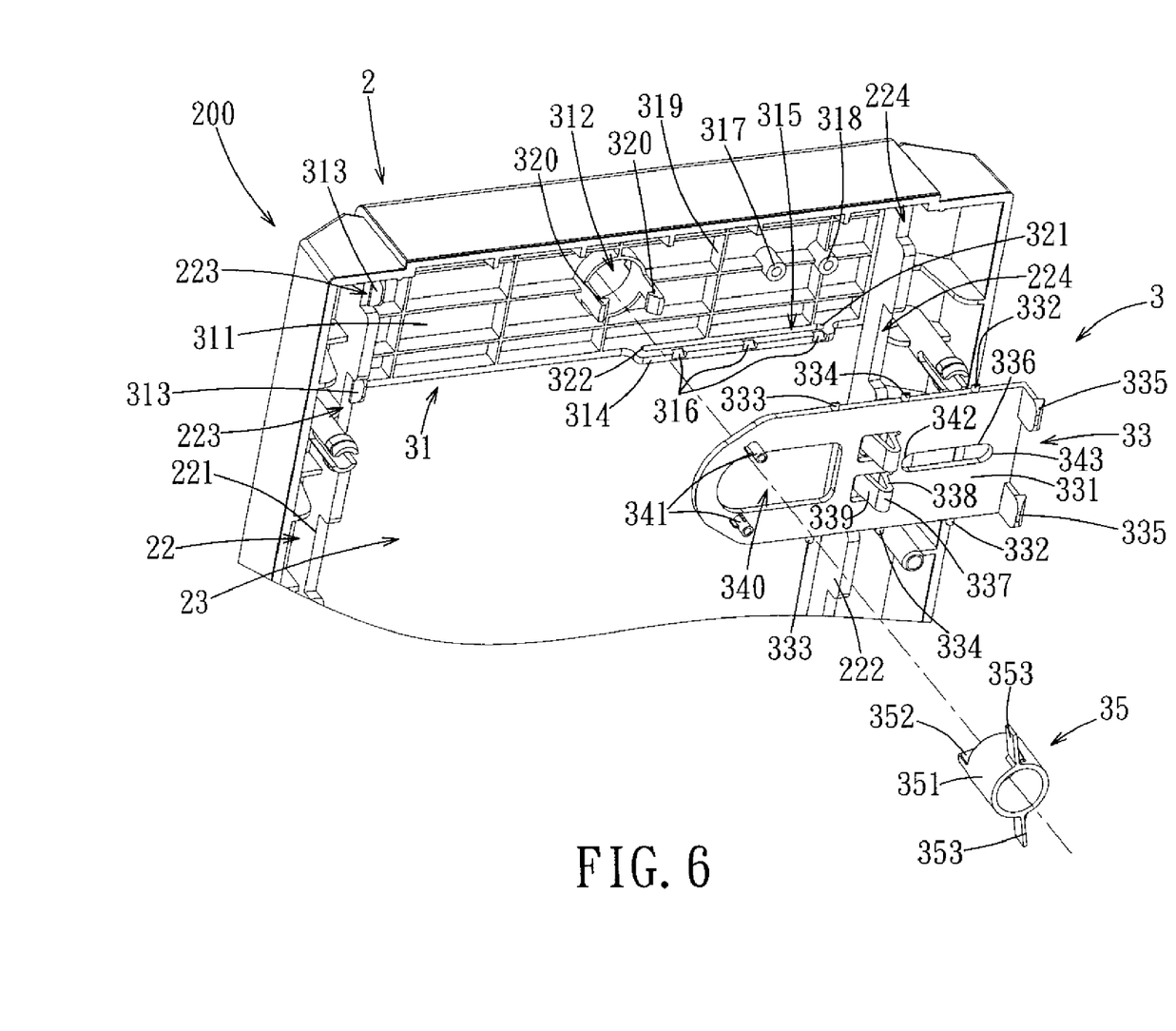
FIG. 6 is a fragmentary exploded perspective view of FIG. 5 to illustrate the assembly relationship between a face panel body and a cover plate assembly.
Figure 7:
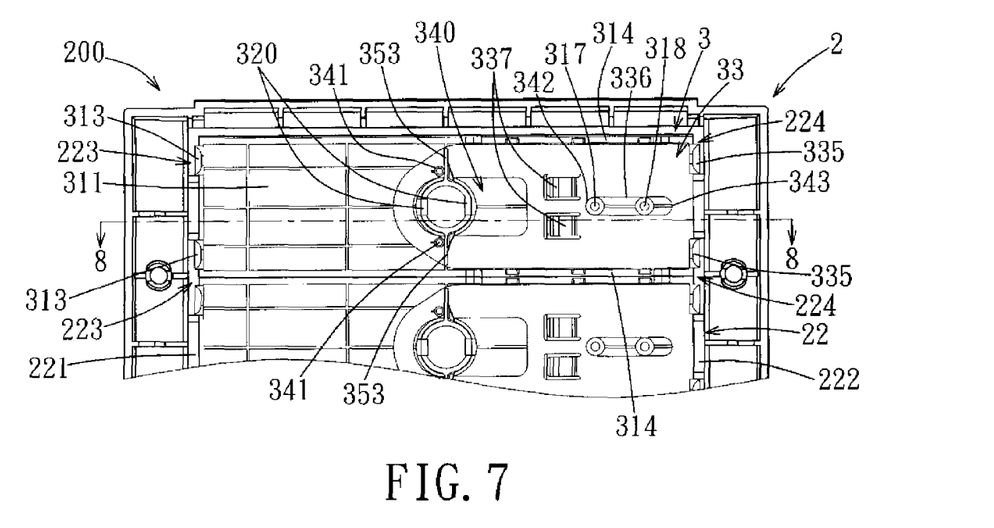
FIG. 7 is a fragmentary schematic rear view of the first preferred embodiment to illustrate the face panel body and the cover plate assembly in a locked state.
Figure 8:
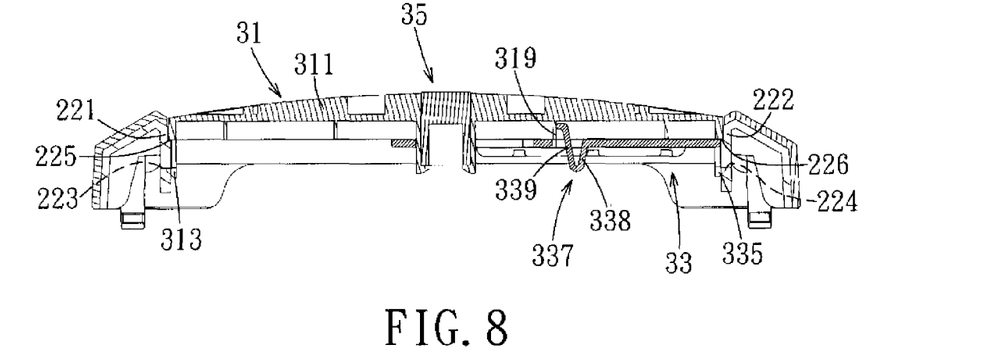
FIG. 8 is a sectional view taken along line 8-8 of FIG. 7, illustrating the face panel body and the cover plate assembly in the locked state.
Figure 9:
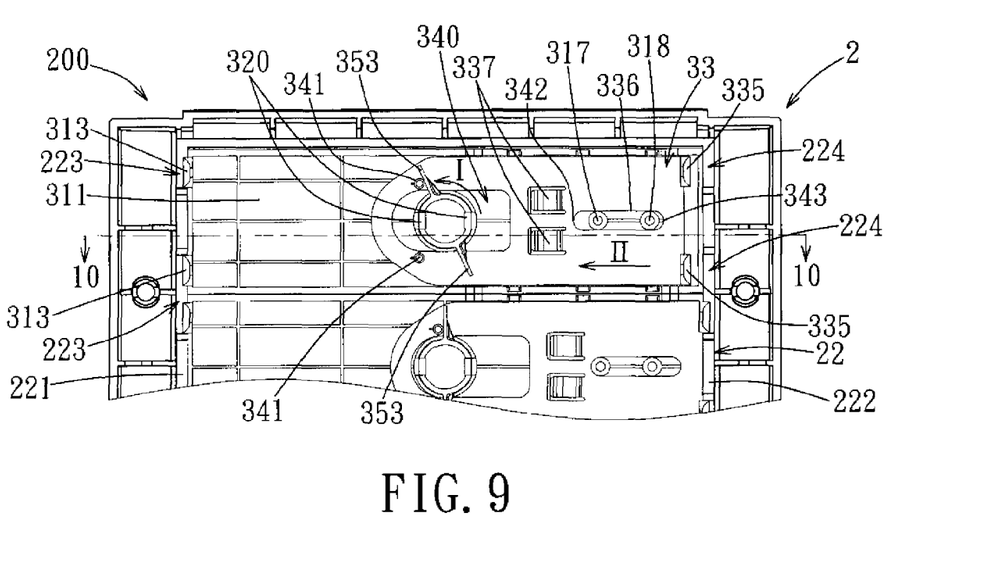
FIG. 9 is a fragmentary schematic rear view of the first preferred embodiment to illustrate the face panel body and the cover plate assembly in an unlocked state.
Figure 10:
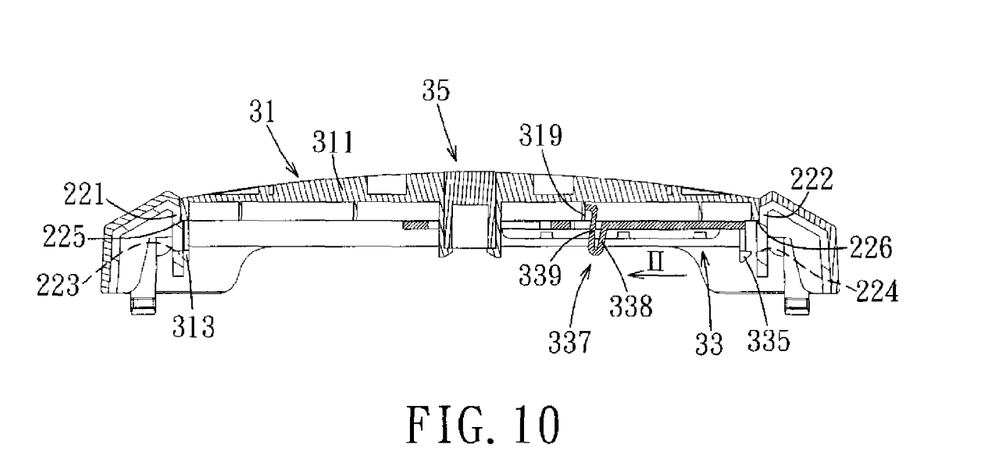
FIG. 10 is a sectional view taken along line 10-10 of FIG. 9, illustrating the face panel body and the cover plate assembly in the unlocked state.

As shown in FIGS. 6, 7 and 8, the locking member 33 has a base plate 331, and a pair of first protrusions 332, a pair of second protrusions 333, and a pair of third protrusions 334, the protrusions in each pair projecting respectively from upper and lower ends of the base plate 331. The first protrusions 332 and the second protrusions 333 are respectively located on right and left sides of the third protrusions 334. The first, second and third protrusions 332, 333, 334 may be guided by the guide ways 316 in the two extension plates 314 of the cover plate 31 to be retained in the guide grooves 315 in the two extension plates 314. Thus, the locking member 33 may be mounted slidably in the guide grooves 315 of the two extension plates 314 so as to be slidable along extension directions of the guide grooves 315 in the extension plates 314. The locking member 33 further has two second engaging hooks 335 that project rearwardly from a rear face of the base plate 331 proximate to the right end thereof and that are spaced apart with one above the other, an elongated guide hole 336 extending through the base plate 331 and along the left-right direction, and two restoring resilient plates 337 formed on the base plate 331. Each of the second engaging hooks 335 is used to engage a respective one of the second engaging grooves 224 in the right side wall portion 222. The elongated guide hole 336 is for extension of a first stud 317 and a second stud 318 on the rear face of the plate body 311 of the cover plate 31. Each of the restoring resilient plates 337 includes a first plate portion 338 extending rearwardly from the base plate 331, and a second plate portion 339 bending and extending forwardly from a distal end of the first plate portion 338. The second plate portion 339 abuts against a rib 319 on the rear face of the plate body 311 of the cover plate 31. The restoring resilient plates 337 apply a pressure to the plate body 311 through the second plate portions 339 so as to provide the locking member 33 with a restoring resilient force.

The unlocking member 35 has a cylindrical body 351, an operating portion 352 projecting from a front face of the cylindrical body 351, and two contact portions 353 projecting upwardly and downwardly from an outer surface of the cylindrical body 351 proximate to a rear end of the cylindrical body 351. The cylindrical body 351 of the unlocking member 35 extends through a through hole 340 in the base plate 331 and the through plate hole 312 in the cover plate 31. By using two positioning hooks 320 provided on the rear face of the plate body 311 of the cover plate 31 to engage a rear face of the cylindrical body 351 of the unlocking member 35, the unlocking member 35 may be securely mounted to the cover plate 31 and the locking member 33. In this state, the operating portion 352 of the unlocking member 35 is exposed through the through plate hole 312 for operation by a user, and the two contact portions 353, which are in the form of tabs, are located at the rear face of the base plate 331 of the locking member 33 and are respectively proximate to right sides of two posts 341 that project from the rear face of the base plate 331 and that are spaced apart with one above the other. Since each of the posts 341 is located along a path of rotation of the adjacent contact portion 353, when the user rotates the operating portion 352 of the unlocking member 35, the contact portions 353 will be brought to rotate therewith and will in turn push one of the posts 341, thereby bringing the locking member 33 to move along the extension direction of the guide grooves 315 in the two extension plates 314.

When the first engaging hooks 313 of the cover plate 31 respectively engage the first engaging grooves 223, rear ends of the left and right sides of the plate body 311 of the cover plate 31 respectively abut against shoulder portions 225, 226 formed respectively on the left and right side wall portions 221, 222. Due to the resilient action of the restoring resilient plates 337, the first protrusions 332 on the locking member 33 are constantly urged to abut against a first end 321 of the guide grooves 315 on the right side, the first stud 317 on the cover plate 31 abuts against a first end portion 342 of the elongated guide hole 336 on the left side, and the second engaging hooks 335 respectively engage the second engaging grooves 224. At this time, the cover plate assembly 3 is in a locked state relative to the face panel body 2.

As shown in FIGS. 4, 6, 9 and 10, when the user rotates the operating portion 352 of the unlocking member 35 in a direction indicated by arrow (I), the upper contact portion 353 of the unlocking member 35 will push the upper post 341 of the locking member 33 to move leftward in a direction indicated by arrow (II) toward the first engaging hooks 313 so as to move the locking member 33 along the guide grooves 315. At the same time, the second plate portions 339 of the restoring resilient plates 337 will move closer toward the first plate portions 338 due to movement of the locking member 33 relative to the rib 319 on the cover plate 31. When the second protrusion 333 on each of the upper and lower ends of the locking member 33 is moved to be proximate to a second end 322 of the guide groove 315 in the respective extension plate 314 on the left side, and when a second end portion 343 of the elongated guide hole 336 on the right side is proximate to the second stud 318, the second engaging hooks 335 are completely disengaged from the second engaging grooves 224, thereby placing the cover plate assembly 3 and the face panel body 2 in an unlocked state. When the second protrusion 333 on each of the upper and lower ends of the locking member 33 abuts against the second end 322 of the guide groove 315 in the respective extension plate 314, and when the second stud 318 abuts against the second end portion 343 of the elongated guide hole 336, the locking member 33 is prevented from moving any further.

Figure 11:
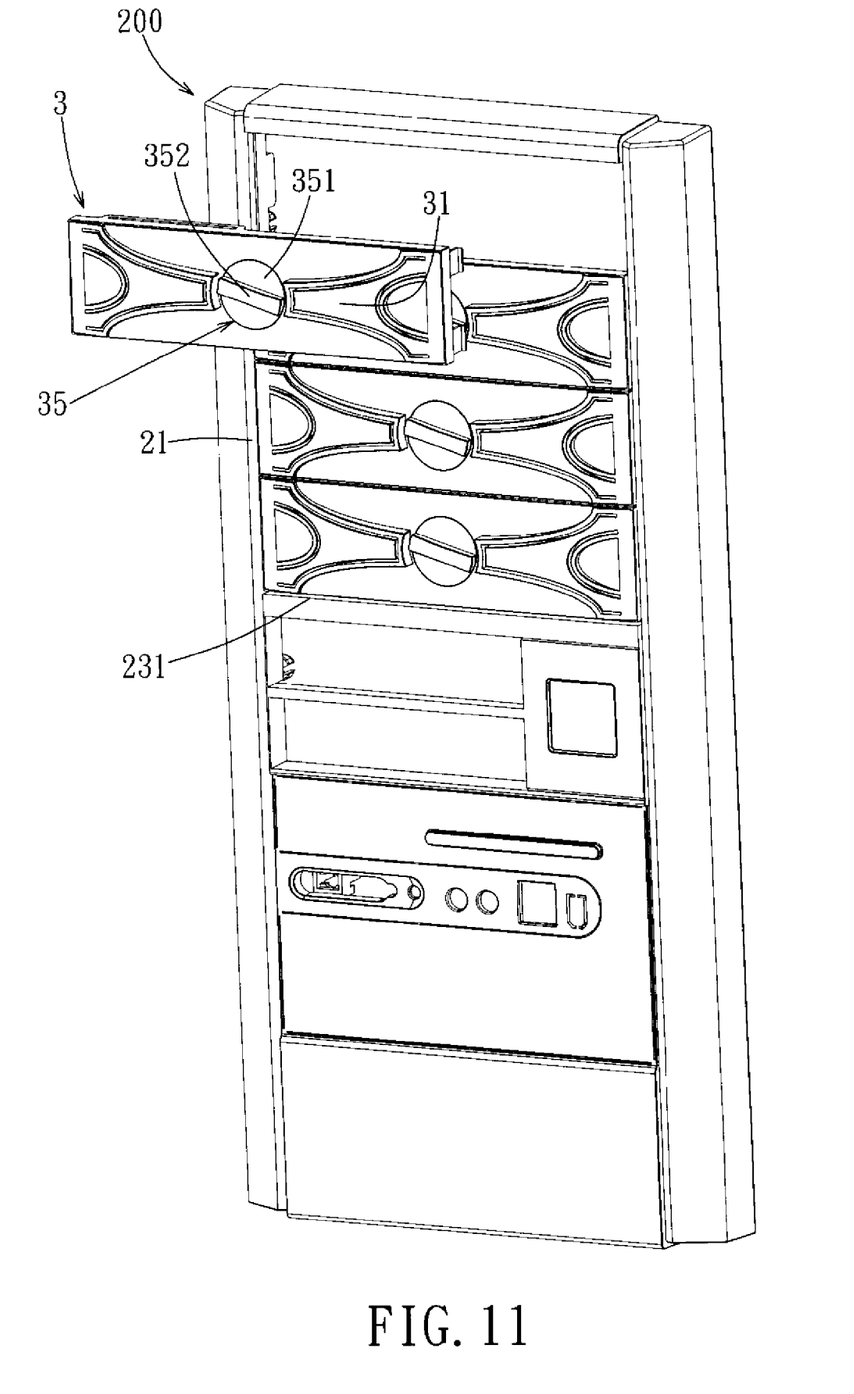
FIG. 11 is a perspective view of the first preferred embodiment to illustrate how the cover plate assembly is removed from an opening of a mounting hole in the face panel body in the unlocked state.

In the unlocked state, the cover plate 31 of the cover plate assembly 3 can be pulled forwardly from the right side. After the first engaging hooks 313 of the cover plate 31 are respectively disengaged from the first engaging grooves 223, the user can remove the cover plate assembly 3 through the opening 231 in the mounting hole 23, as shown in FIG. 11. It is noted that the user can also rotate the operating portion 352 of the unlocking member 35 in a direction indicated by arrow (III) opposite to the direction indicated by arrow (I). In that case, the lower contact portion 353 of the unlocking member 35 will push the lower post 341 on the locking member 33 to move leftward in the direction indicated by arrow (II). Thus, the user is allowed to rotate the operating portion 352 of the unlocking member 35 in a clockwise or counterclockwise direction.

In addition, when it is desired to reassemble the cover plate assembly 3 to the face panel body 2, the cover plate assembly 3 is mounted in the mounting hole 23 through the opening 231. When the second engaging hooks 335 of the locking member 33 touch the right side wall portion 222, the locking member 33 will be pressed and moved leftward, and the second plate portions 339 of the restoring resilient plates 337 will move closer toward the first plate portions 338 due to movement of the locking member 33 relative to the rib 319 on the cover plate 31. After the first engaging hooks 313 of the cover plate 31 are moved to where the first engaging grooves 223 are located, the first engaging hooks 313 will engage the first engaging grooves 223. When the second engaging hooks 335 of the locking member 33 are moved to where the second engaging grooves 224 are located, the second engaging hooks 335 will be brought to engage the second engaging grooves 224 by virtue of the resilient force of the restoring resilient plates 337. Thus, the cover plate assembly 3 and the face panel body 2 will be placed in the locked state once again.

It is worth noting that, in this embodiment, the locking member 33 may have only one post 341 and the unlocking member 35 may have only one contact portion 353 to permit the user to operate the unlocking member 35 in a single direction. The effect of enabling the unlocking member 35 to drive the locking member 33 to move can likewise be achieved. However, the provision of two posts 341 and two contact portions 353 as in this embodiment is preferred so as to permit the user to rotate the unlocking member 35 in both the clockwise direction and the counterclockwise direction. Furthermore, the cover plate 31 may be provided with only one extension plate 314 while still permitting slidable connection with the locking member 33. However, the arrangement of the upper and lower extension plates 314 as in this embodiment is preferred so as to ensure stability of the locking member 33 during the sliding process.

Figure 12:
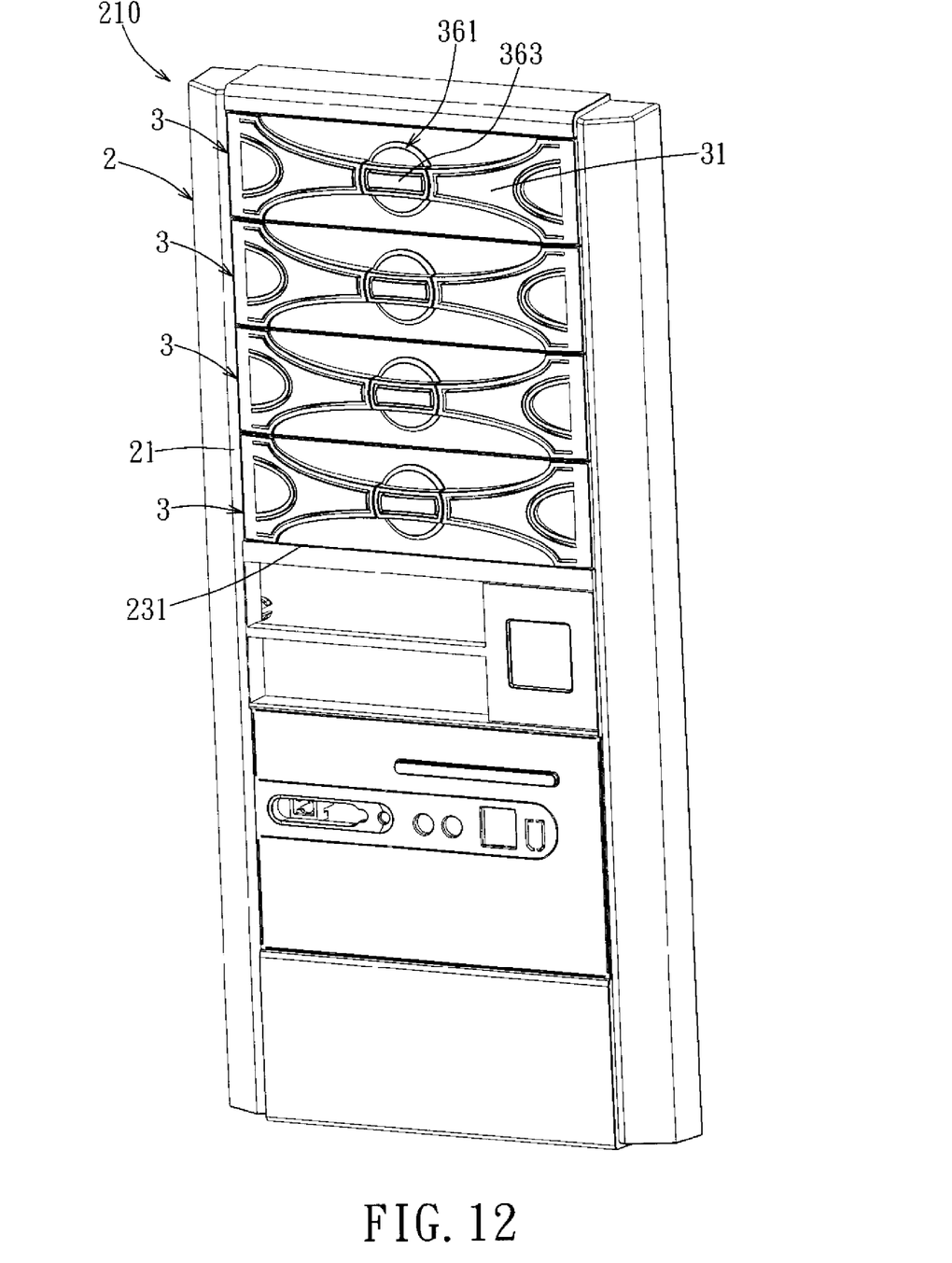
FIG. 12 is a perspective view of the second preferred embodiment of a face panel for a computer housing according to the present invention.
Figure 13:
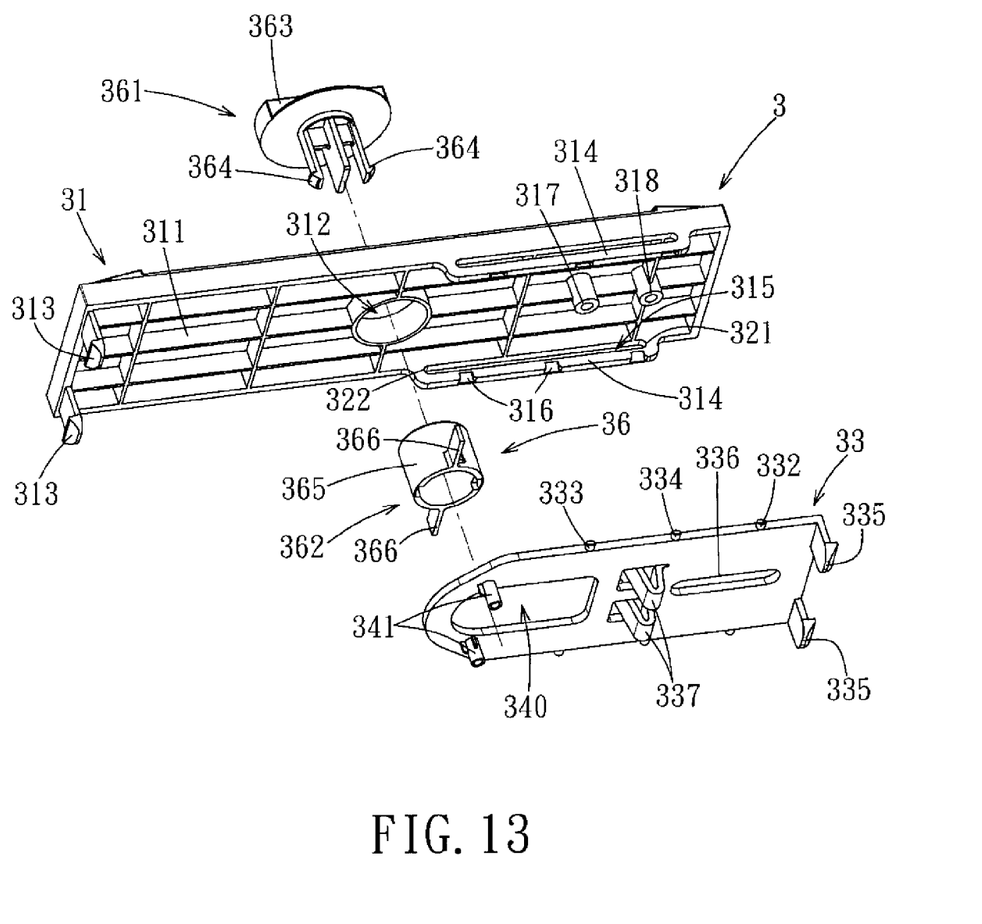
FIG. 13 is an exploded perspective view to illustrate a cover plate assembly of the second preferred embodiment.
Figure 14:
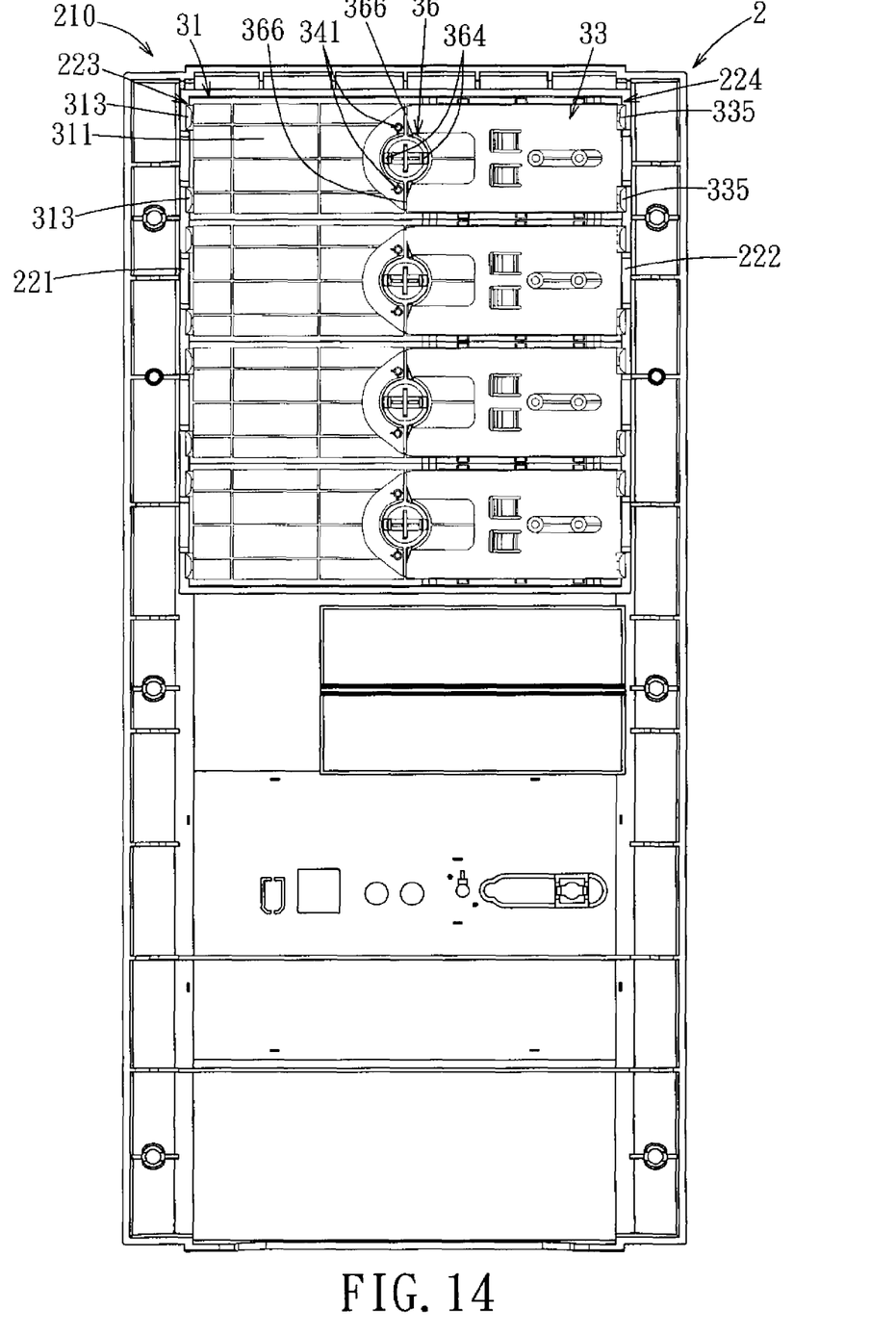
FIG. 14 is a schematic rear view of the second preferred embodiment.

Referring to FIGS. 12, 13 and 14, the second preferred embodiment of a face panel 210 for a computer housing according to the present invention is substantially similar to the first preferred embodiment in overall structure and operation. The difference resides mainly in the configuration of the unlocking member 36.

The unlocking member 36 has a control knob 361 and a sleeve 362 assembled to the control knob 361. The control knob 361 includes an operating portion 363 disposed on a front side thereof, and two positioning hooks 364 projecting from a rear side thereof and extending through the through plate hole 312 and the through hole 340. The sleeve 362 includes a cylindrical body 365 extending through the through hole 340 and fitted onto the positioning hooks 364, and two contact portions 366 projecting respectively upward and downward from an outer surface of the cylindrical body 365 proximate to a rear end of the same. The two positioning hooks 364 engage the rear end of the cylindrical body 365. Thus, when the user rotates the operating portion 363 of the control knob 361, the sleeve 362 can be simultaneously brought to rotate therewith so that the contact portions 366 of the sleeve 363 push one of the posts 341 to thereby move the locking member 33.

In sum, in the two preferred embodiments of a face panel 200, 210 for a computer housing according to the present invention, with the arrangement of the cover plate assembly 3, rotation of the unlocking member 35, 36 by the user can drive the locking member 33 to move so as to disengage the second engaging hooks 335 of the locking member 33 from the second engaging grooves 224. Thus, the cover plate assembly 3 can be quickly and conveniently detached from the face panel body 2 from the front. In addition, by using the restoring resilient spring plates 337 to restore the second engaging hooks 335 to an engaging position, the cover plate assembly 3 is switchable between locked and unlocked states with respect to the face panel body 2.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements. In addition, it should be appreciated that any of the embodiments as described herein or any of the claims as appended hereto does not necessarily have to achieve all of the objects, advantages or features disclosed herein. Moreover, the title of the invention and the abstract of disclosure are provided herein to allow a searcher to quickly ascertain the subject matter of the technical disclosure of any patent issued on this application, and should not be relied upon to limit the scope of protection sought in this invention.

What is claimed is:

1. A face panel for a computer housing, comprising:
a face panel body including a surrounding wall, and a mounting hole defined by said surrounding wall and having a forward opening, said surrounding wall having a first engaging groove and a second engaging groove located respectively at left and right sides thereof; and
a cover plate assembly provided in said mounting hole and assembled to said surrounding wall, said cover plate assembly including:
a cover plate having a through plate hole extending in a front-rear direction, a first engaging hook for engaging said first engaging groove, and at least one guide groove provided in a rear face thereof and extending along a left-right direction;
a locking member connected slidably to said guide groove and having a second engaging hook for engaging said second engaging groove, a through hole corresponding in position to said through plate hole, at least one post projecting from a rear face thereof, and a restoring resilient plate for applying a pressure to said cover plate so as to enable said second engaging hook to engage said second engaging groove; and
an unlocking member extending through said through plate hole and said through hole and having an operating portion exposed through said through plate hole, and at least one contact portion disposed opposite to said operating portion and movable by rotation of said operating portion so as to push said post to move, such that said second engaging hook is disengaged from said second engaging groove.

2. The face panel for a computer housing according to claim 1, wherein said contact portion is located between said post and said second engaging hook, and said post is located on a path of rotation of said contact portion.

3. The face panel for a computer housing according to claim 1, wherein said locking member has two of said posts projecting from said rear face thereof, said posts being spaced apart with one above the other, said unlocking member having two of said contact portions disposed opposite to said operating portion, said contact portions being located between said two posts and said second engaging hook, said two posts being respectively located on rotation paths of said two contact portions.

4. The face panel for a computer housing according to claim 1, wherein said cover plate further has a rib provided on said rear face thereof, said restoring resilient plate including a rearwardly extending first plate portion, and a second plate portion bending and extending forwardly from a distal end of said first plate portion and abutting against said rib.

5. The face panel for a computer housing according to claim 1, wherein said guide groove includes a first end, and a second end opposite to said first end, said locking member further having first and second protrusions located within said guide groove for abutting against said first end and for abutting against said second end, respectively, said restoring resilient plate applying the pressure to said cover plate such that said first protrusion abuts against said first end.

6. The face panel for a computer housing according to claim 1, wherein said contact portion is movable by rotation of said operating portion to push said post to move in a direction toward said first engaging hook.

7. The face panel for a computer housing according to claim 2, wherein said cover plate further has a rib provided on said rear face thereof, said restoring resilient plate including a rearwardly extending first plate portion, and a second plate portion bending and extending forwardly from a distal end of said first plate portion and abutting against said rib.

8. The face panel for a computer housing according to claim 7, wherein said cover plate has two of said guide grooves provided in said rear face thereof, extending in the left-right direction, and disposed respectively proximate to upper and lower ends of said cover plate, said locking member being connected slidably between said two guide grooves.

9. The face panel for a computer housing according to claim 8, wherein each of said guide grooves has a first end, and a second end opposite to said first end, said locking member further having two first protrusions located respectively in said two guide grooves for abutting respectively against said first ends, and two second protrusions located respectively in said two guide grooves for abutting respectively against said second ends, said restoring resilient plate applying the pressure to said cover plate such that said first protrusions abut respectively against said first ends.

10. The face panel for a computer housing according to claim 8, wherein said locking member has an elongated guide hole extending along the left-right direction, said elongated guide hole including a first end portion, and a second end portion opposite to said first end portion, said cover plate further having first and second studs located within said elongated guide hole, said first and second studs being disposed for abutting against said first and second end portions, respectively, said restoring resilient plate applying the pressure to said cover plate such that said first stud abuts against said first end portion.

11. The face panel for a computer housing according to claim 8, wherein said contact portion is movable by rotation of said operating portion to push said post to move in a direction toward said first engaging hook.

12. The face panel for a computer housing according to claim 3, wherein said cover plate further has a rib provided on said rear face thereof, said restoring resilient plate including a rearwardly extending first plate portion, and a second plate portion bending and extending forwardly from a distal end of said first plate portion and abutting against said rib.

13. The face panel for a computer housing according to claim 12, wherein said cover plate has two of said guide grooves provided in said rear face thereof, extending in the left-right direction, and disposed respectively proximate to upper and lower ends of said cover plate, said locking member being connected slidably between said two guide grooves.

14. The face panel for a computer housing according to claim 13, wherein each of said guide grooves has a first end, and a second end opposite to said first end, said locking member further having two first protrusions located respectively in said two guide grooves for abutting respectively against said first ends, and two second protrusions located respectively in said two guide grooves for abutting respectively against said second ends, said restoring resilient plate applying the pressure to said cover plate such that said first protrusions abut respectively against said first ends.

15. The face panel for a computer housing according to claim 13, wherein said locking member has an elongated guide hole extending along the left-right direction, said elongated guide hole including a first end portion, and a second end portion opposite to said first end portion, said cover plate further having first and second studs located within said elongated guide hole, said first and second studs being disposed for abutting against said first and second end portions, respectively, said restoring resilient plate applying the pressure to said cover plate such that said first stud abuts against said first end portion.

16. The face panel for a computer housing according to claim 13, wherein said unlocking member further has a cylindrical body extending through said through hole and said through plate hole, said cover plate further having two positioning hooks provided on said rear face thereof for engaging a rear end of said cylindrical body.

17. The face panel for a computer housing according to claim 13, wherein said unlocking member further has a control knob defining said operating portion, and a sleeve defining said two contact portions, said control knob including two positioning hooks extending through said sleeve and engaging a rear end of said sleeve.

18. The face panel for a computer housing according to claim 13, wherein each of said contact portions is movable by rotation of said operating portion so as to push a respective one of said posts to move in a direction toward said first engaging hook.

* * * * *